(12) United States Patent
O'Shea et al.

(10) Patent No.: US 12,539,489 B2
(45) Date of Patent: Feb. 3, 2026

(54) HUMIDITY CONTROL SLURRIES, APPARATUSES, AND METHODS OF MAKING SAME

(71) Applicant: Boveda, Inc., Minnetonka, MN (US)

(72) Inventors: Tina O'Shea, Minnetonka, MN (US); Robert L. Esse, Minnetonka, MN (US); Jonathan W. DeVries, Minnetonka, MN (US); Brian Rice, Minnetonka, MN (US)

(73) Assignee: Boveda, Inc., Minnetonka, MN (US)

( * ) Notice: Subject to any disclaimer, the term of this patent is extended or adjusted under 35 U.S.C. 154(b) by 0 days.

(21) Appl. No.: 18/320,031

(22) Filed: May 18, 2023

(65) Prior Publication Data
US 2023/0285894 A1    Sep. 14, 2023

Related U.S. Application Data

(62) Division of application No. 16/717,319, filed on Dec. 17, 2019, now abandoned.

(60) Provisional application No. 62/780,676, filed on Dec. 17, 2018.

(51) Int. Cl.
*B01D 53/28*     (2006.01)
*B65D 81/26*     (2006.01)

(52) U.S. Cl.
CPC ........... *B01D 53/28* (2013.01); *B65D 81/268* (2013.01); *B01D 2259/126* (2013.01); *B01D 2259/4525* (2013.01)

(58) Field of Classification Search
None
See application file for complete search history.

(56) References Cited

U.S. PATENT DOCUMENTS

| | | | |
|---|---|---|---|
| 4,098,120 A * | 7/1978 | Manske | G01N 21/81 116/200 |
| 4,384,972 A | 5/1983 | Nakamura et al. | |
| 4,474,570 A * | 10/1984 | Ariura | A61N 1/0436 604/20 |
| 5,035,731 A | 7/1991 | Spruill | |
| 5,037,459 A * | 8/1991 | Spruill | B65D 81/24 426/118 |
| 5,284,513 A | 2/1994 | Cowan | |
| 5,285,960 A * | 2/1994 | Zografos | G01N 7/04 236/44 E |
| 5,389,532 A * | 2/1995 | Divies | C12G 1/0203 426/11 |
| 5,629,271 A | 5/1997 | Dobson, Jr. | |
| 5,885,481 A | 3/1999 | Venkateshwaran et al. | |
| 5,934,773 A | 8/1999 | Ferrell | |
| 5,936,178 A * | 8/1999 | Saari | G10D 3/00 84/453 |
| 6,139,935 A | 10/2000 | Cullen et al. | |

(Continued)

*Primary Examiner* — Joseph D Anthony
(74) *Attorney, Agent, or Firm* — Padda Law Group (57) ABSTRACT

Slurries and methods of making slurries for modifying and extending relative humidity control ranges. The slurries may include a saturated aqueous salt and one or more other reagents selected to provide a controlled modifiable narrow range of relative humidity. The saturated aqueous salt may be one or more of sodium chloride, potassium chloride, potassium citrate, sodium formate, and/or magnesium chloride, and the one or more other reagents may be one or more of a lactate salt, glycerol, and/or an acetate salt, for example.

11 Claims, 9 Drawing Sheets

(56) References Cited

U.S. PATENT DOCUMENTS

| | | | |
|---|---|---|---|
| 6,244,432 B1* | 6/2001 | Saari | G10D 3/00 |
| | | | 206/213.1 |
| 6,436,872 B2 | 8/2002 | McKedy | |
| 6,508,955 B1 | 1/2003 | DelDuca et al. | |
| 6,646,121 B2 | 11/2003 | El Kabbani et al. | |
| 6,921,026 B2* | 7/2005 | Saari | B65D 81/2076 |
| | | | 34/446 |
| 8,748,723 B1* | 6/2014 | Egberg | B01D 53/263 |
| | | | 261/99 |
| 9,616,381 B2 | 4/2017 | Glorioso et al. | |
| 2013/0122140 A1 | 5/2013 | Kim | |
| 2014/0066339 A1 | 3/2014 | Tej | |
| 2016/0358244 A1 | 12/2016 | Schmitz | |
| 2017/0043292 A1* | 2/2017 | Glorioso | B01D 53/263 |
| 2017/0045461 A1* | 2/2017 | Glorioso | B01J 20/28047 |

* cited by examiner

HUMIDITY CONTROL SLURRIES, APPARATUSES, AND METHODS OF MAKING SAME

CROSS REFERENCE TO RELATED APPLICATIONS

The present disclosure claims priority to Provisional Application No. 62/780,676, filed Dec. 17, 2018, and to application Ser. No. 16/717,319, filed Dec. 17, 2019, which the present disclosure is a divisional of. The present disclosure hereby incorporates both applications herein in their entirety.

FIELD OF THE INVENTION

The present disclosure relates to novel and advantageous systems and methods for modifying and extending relative humidity control ranges using a device or system to maintain the relative humidity in a closed environment. More particularly, the present disclosure relates to novel and advantageous systems and methods to modify and extend relative humidity control ranges in a closed environment using a slurry comprising a saturated salt and an additive.

BACKGROUND OF THE INVENTION

The background description provided herein is for the purpose of generally presenting the context of the disclosure. Work of the presently named inventors, to the extent it is described in this background section, as well as aspects of the description that may not otherwise qualify as prior art at the time of the filing, are neither expressly nor impliedly admitted as prior art against the present disclosure.

There is a need to keep pharmaceutical, health care, electronics, food, plant materials, tobacco products, and instruments, for example, at a constant and regulated moisture and relative humidity level when they are stored in a container assembly.

In order to keep contents in an optimized state, controlling relative humidity at a specified level is preferred and/or necessary. The desired humidity or predetermined humidity to maintain product optimization (e.g. freshness, usefulness, minimization of damage or decay) is variable in that different products may need to be maintained at differing respective optimum relative humidities. For example, some products are able to maintain freshness when kept dry or at zero or relatively close to zero relative humidity ("RH") and other products maintain freshness when maintained at a relatively high level of humidity.

Embodiments of the present disclosure address the maintenance of a predetermined relative humidity in a container assembly to maintain the best quality of a product held in the container assembly, which may be a pharmaceutical product, a health care product, an electronics component, a food product, a plant material, a tobacco product or nearly any product that may benefit from storage in a predetermined relative humidity environment.

For many packaged products, including packaged consumer products, it is beneficial to maintain a particular moisture content within the package containing the product. Some humidity control devices are configured to help maintain a consistent relative humidity of the space within the product package that is not taken up by the product itself. The RH may be maintained at a level or range deemed optimum for the particular packaged product. It is understood by those skilled in the art that the percent RH ("% RH") in the package will result in a percent by weight product moisture content, but that the % RH in the space not taken up by the product and the product percent moisture by weight are different values that differ based on the characteristics of the product and its propensity to absorb moisture from or desorb moisture to the surrounding atmosphere. Many products may be consumed, utilized, or accessed by a consumer over a period of time, and maintaining a consistent RH may help preserve the life, integrity, freshness, flavor, or other features of the product.

Many molds grow readily at water activity ("$a_w$") greater than 0.85 and some grow significantly at $a_w$ of 0.75. Since it may be desirable to have as much water in the product to maintain a pleasing texture yet prevent or control the amount of mold growth, it may be important to maintain the $a_w$ of such products in a narrow range just below the $a_w$ value at which significant mold growth, if any, occurs.

While certain existing saturated salt humidity control solutions are well suited to effectively control and maintain a desired humidity level, there is an opportunity to improve upon such solutions by providing a humidity control solution with the properties of little to no odor and/or odor elimination, and/or colorized to be visible or black light, and/or little to no large crystal formation in the slurry/solution and/or extended absorption and desorption at the desired relative humidity for example.

SUMMARY

Various embodiments include slurries for modifying and extending relative humidity control ranges including a saturated aqueous salt and one or more other reagents in which the slurry may provide a controlled modifiable narrow range of relative humidity. The aqueous salt and the select other reagents may be food grade components per Foods Chemicals Codex (FCC). In some embodiments, the slurry may be substantially odorless and/or large crystals may not form in the slurry during normal use of the slurry. The saturated aqueous salt may be one or more of sodium chloride, potassium chloride, potassium citrate, sodium formate, or magnesium chloride. The one or more reagents may be a lactate salt, glycerol, an acetate salt, and/or a food-grade optically and/or UV active additive, for example. In some embodiments, the slurry may further include a thickening agent such as a gum. In some embodiments, the slurry may include glycerol and a thickening agent.

In some embodiments, the reagents may be added as combinations. In some embodiments, an amount of excess water may be present in ranges from 0% or 0.1% of the slurry concentration level of the other components of the mixture to the water concentration at the maximum humidity control point wherein saturation no longer exists.

In some embodiments, the slurry may include 0 or 0.1% to 2% of a food grade gum providing viscosity control. In some embodiments, the additive concentration may exceed the salt concentration. While in some embodiments the slurry may be a saturated salt solution, in other embodiments the salt solution may not be saturated. In some embodiments, the slurry may have a self-indicating property with regard to need for replacement. The slurry may not lose the self-indicating property, such as during production or use of the slurry.

Various embodiments also include slurries for modifying and extending relative humidity control ranges including a saturated aqueous salt including one or more of sodium chloride, potassium chloride, potassium citrate, sodium formate, and/or magnesium chloride, and one or more other reagents comprising a lactate salt, glycerol, and/or an acetate salt. The slurry may provide a controlled modifiable narrow range of relative humidity. In some embodiments, the slurry may include up to 2% of a food grade gum, such as 0%-2%, or 0.1%-2%.

Various other embodiments also include methods of making slurries for modifying and extending relative humidity control ranges. In some embodiments, the method may include combining a saturated aqueous salt and one or more other reagents wherein the slurry provides a controlled modifiable narrow range of relative humidity. The other reagents may include lactate salt, glycerol, and/or an acetate salt, for example.

BRIEF DESCRIPTION OF THE DRAWINGS

While the specification concludes with claims particularly pointing out and distinctly claiming the subject matter that is regarded as forming the various embodiments of the present disclosure, it is believed that the disclosure will be better understood from the following description taken in conjunction with the accompanying Figures, in which:

DETAILED SUMMARY OF THE INVENTION

This application claims priority to provisional application No. 62/780,676 filed Dec. 17, 2018 and entitled Improved Humidity Control Solution, Apparatus, and Method of Making Same, the entire contents of which are hereby incorporated by reference.

The present disclosure relates to novel and advantageous systems and methods for modifying and extending relative humidity control such as targets and ranges of relative humidity, minimizing odor, having color visible with visible or black light, and minimizing large crystal formation (i.e. crystals larger than typical table salt crystals) while not losing the system's self-indicating properties with regard to need for replacement when using a device or system to maintain the relative humidity in a closed environment. More particularly, the present disclosure relates to novel and advantageous systems and methods to modify and extend relative humidity control ranges in a closed environment using a slurry comprising a saturated salt and an additive in some embodiments. The slurry may be referred to as a moisture-controlling solution, a humidity control solution, a humidity control agent, or a saturated salt humidity control solution.

A slurry may be used in relative humidity (RH) control devices or systems to maintain a desired humidity in a closed environment, e.g. a sealed container that may be opened and then resealed repeatedly for access to a product stored therein. The slurries disclosed herein may alternatively be referred to as humidity control solutions. The slurry may be provided in a delivery vehicle to provide humidity control to a target environment in a closed system that may include a product such that it may be maintained at or near a specific RH.

In some embodiments, the slurry or humidity control solutions/systems in accordance with the disclosure are introduced into a delivery vehicle or container that is generally water vapor permeable and liquid water impermeable. Such container may be referred to as a relative humidity control device and may comprise, for example, a polymeric film pouch having at least some walls sufficiently permeable to permit migration of water vapor through the film and yet thick and impervious enough to prevent the escape of liquids. The control device or delivery vehicle may be used to control humidity within a generally closed environment including but not limited to, an enclosure such as a container with a removable cap, such as an glass jar, for protecting the contents stored therein.

In some embodiments, the slurry may be provided in pouches formed from polymeric films that breathe in a manner such that they will transport moisture vapor but will contain the solution without leaking liquid. The water vapor transport, known as water vapor transmission rate (WVTR) may be measured in terms of grams of water passed per 100 square inches of material per 24 hours under standard test conditions. The WVTR is a function of the type of film used and the thickness of the film. The total moisture transferred, is also dependent upon the area of film exposed to a humidity control solution in a given application. It has been shown that a WVTR of about 10 grams water per 100 square inches over 24 hours provides good results for a device in accordance with the invention.

Packaging film materials that may be used in embodiments of the present disclosure include polyvinylchloride, fibrous polyethylene (TYVEK™), cellophane, polycarbonate, thin polyolefin, oriented polystyrene, polyfluorocarbon, or polyester laminated onto a suitable substrate such as paper. A delivery vehicle such as a pouch may comprise, for example, polyamide nylon film, such as Capran™, styrene-butadiene copolymer such as K-Resin™, cellulose acetate, polyethylene terephthalate (Mylar™) ethylene vinyl acetate, or ethylene vinyl alcohol.

As disclosed in U.S. Pat. No. 5,936,178, entitled Humidity Control Device, and filed Jun. 10, 1997 and U.S. Pat. No. 6,921,026, entitled Preservation of Intermediate Moisture Foods by Controlling Humidity and Inhibition of Mold Growth, filed Feb. 5, 2002, the contents of which are hereby incorporated by reference in their entirety, the RH of closed environments can be stabilized by the use of humidity control systems comprised of moisture permeable pouches containing specific saturated salt slurry/solutions, for example. The inventive slurry disclosed herein may be delivered in the pouches, or types of pouches, disclosed in the aforementioned patents, in some embodiments.

Alternatively, embodiments of the moisture-controlling solution of the present disclosure may be provided in a dedicated area of a container, such as a glass or plastic container, which may hold a product. The container may have a dedicated space to hold the moisture-controlling solution, such that the liquid may not escape the dedicated space, but water vapor may move into and out of the dedicated space. It will be understood that while the above methods are disclosed and within the scope of the invention, still other delivery methods are within the spirit and scope of the present disclosure.

As discussed above, the present disclosure relates to a relative humidity (RH) control device(s) or a system(s) for use in maintaining a desired humidity in a closed environment, e.g. a sealed container that may be opened and reclosed at intervals. Saturated salt-based RH devices have proven effective to control the relative humidity in a closed environment, such as those disclosed in U.S. Pat. No. 6,921,026, which is incorporated herein in its entirety.

Embodiments of the devices or systems described herein are designed to extend or modify the controlled relative humidity range and/or capacity beyond those salt-based devices described, for example, in U.S. Pat. No. 6,921,026. Embodiments of humidity control solutions of the present disclosure may include the advantageous properties of being odorless or substantially odorless and/or colored to be visible by light such as visible light and black light, and/or the property of preventing or substantially limiting large crystal growth within the solution. Thus, embodiments of the present disclosure may maintain a soft gel-like texture throughout the device's useful life, or a substantial part thereof, but still indicate the need for replenishment by stiffening (hardening) of the gel-like texture.

Further, embodiments of the present disclosure may maintain the desired relative humidity for a longer period of time than existing humidity control solutions, and/or may emit or absorb available water more quickly than existing humidity-control systems, which allows the target environment to reach and maintain the desired relative humidity faster. One reason for this is that water uptake to or release from a device using the embodiments described herein (for the humidity control slurry/solution) that does not include or form large crystals has a more rapid uptake rate than when large crystals are present due to crystal formation and dissolution times.

These advantages may be achieved by embodiments of the present disclosure by providing in a delivery vehicle a humidity control solution that includes an aqueous saturated salt solution, a thickening agent, and compatible specific compounds that extend the controlled relative humidity range provided by the saturated salt itself. It will be understood that other embodiments may include additional additives.

The aqueous saturated salt slurry/solution may include sodium formate, potassium citrate, or magnesium chloride for example.

The thickening agent included in embodiments of the present disclosure may include a food grade gum, such as xanthan gum, that may be pre-hydrated with warm water in some embodiments. In other embodiments, thickening agents may include hydroxyethylcellulose (Natrosol™), alumina (Aeroxide™), or fumed silica (Aerosil™), for example. These thickening agents have a high molecular weight and may be added in low concentrations so that they exert only a minimal effect on the relative humidity control of the device yet substantially increase the viscosity of the solution. In some embodiments, the slurry may comprise approximately 0 to 2% food grade gum, or other thickening agent, for viscosity control, though it will be understood that in other embodiments, more or less thickening agent may be included in the humidity control solution.

The compatible specific compounds that extend the controlled relative humidity range provided by the saturated salt itself may include, for example, glycerol, potassium acetate, and/or sodium lactate.

In addition, a food-grade additive that is optically and/or UV active to be visible in visible or black light, for example, may be added to any of the slurries/solutions illustrated in the embodiments described herein and/or any of the examples below at a level sufficient for the slurry/solution to be visible by an observer in visible light or black light, for example. This additive can be one or a combination of additives selected, for example, from the group consisting of riboflavin, xanthene, erythrosine, tartrazine, FD&C Blue #1 or their derivatives or other food grade colors that are optically and/or UV active. Addition of the optically and/or UV active additive may allow for decorative coloring of the saturated salt slurry/solution, may be used for a visual determination of slurry/solution homogeneity, may be used to visualize the presence of defects such as packaging leaks during the course of manufacturing and use of the humidity control device, and/or other situations wherein visualization aids in either the manufacturing or use of the humidity control slurry/solution, or other circumstances.

Generally, in some embodiments, warm water may be mixed with a food grade gum until the gum is hydrated. A first additive may be added to the hydrated gum and agitated until the resultant first mixture is homogenous, where the first additive may be a compatible specific compound that adjusts the target relative humidity or extends the controlled relative humidity range provided by the saturating salt. A second additive may be added to the first mixture and mixed until a homogenous slurry is created, wherein the second additive may be a specific compound for relative humidity target or relative humidity range or may be a salt in sufficient quantity to create an aqueous saturated salt solution. In some embodiments, the amount of water present in the homogenous slurry can range from 0% concentration of the slurry/solution to the maximum water level wherein salt saturation no longer exists.

The resultant humidity control solution may be dispensed into a container which has a water vapor transmission rate of approximately 10 grams/100 square inches/24 hours under standard test conditions, or greater, in some embodiments. It will be understood that other WVTRs may be achieved using the humidity control solution of the present disclosure depending on the container that is used.

The quantity of humidity control material or agent provided within the container may vary based on desired RH control capacity, size of product package or container assembly, and/or other factors.

The following presents a simplified summary of one or more embodiments of the present disclosure in order to provide a basic understanding of such embodiments. This summary is not an extensive overview of all contemplated embodiments and is intended to neither identify key or critical elements of all embodiments, nor delineate the scope of any or all embodiments.

The quantity of humidity control material or agent provided within the container may vary based on desired RH control capacity, size of product package or container assembly, and/or other factors. The quantity of humidity control agent may vary from, for example, less than one (1) gram to more than ten (10) grams of material for each container assembly. For example, in some embodiments the quantity of control agent may be 20 g, 25 g, 30 g, 60 g, or more depending on the need. It may be advantageous to achieve a workable balance between the "footprint" of the humidity control agent and its thickness. A larger footprint, while reducing thickness, may increase a width and length of the container assembly and thus require different volume and sizes.

The humidity control agent may allow for one-way or two-way humidity control in some embodiments. That is, the humidity control agent may be configured to remove moisture from the air and/or to add moisture to the air within a storage cavity or container. In some embodiments, one or more additives may be combined with the humidity control agent, including but not limited to the additives described in U.S. Pat. Nos. 9,750,811 and/or 5,936,178. For example, some additives may be used to increase or otherwise control viscosity levels of the humidity control agent or other features of the humidity control agent, as may be desirable for the designer or user.

WORKING EXAMPLES

Example 1

In one embodiment, 100 grams of water are mixed with 0.7 to 1.3 grams of xanthan gum until the gum is hydrated, and approximately 36 to 70 grams of glycerol are added with stirring until the mixture is substantially homogeneous. Approximately 82 to 158 grams of sodium formate are added and the mixing is continued until the resultant slurry is substantially homogeneous to form a saturated salt slurry/solution mixture.

Figure 1:
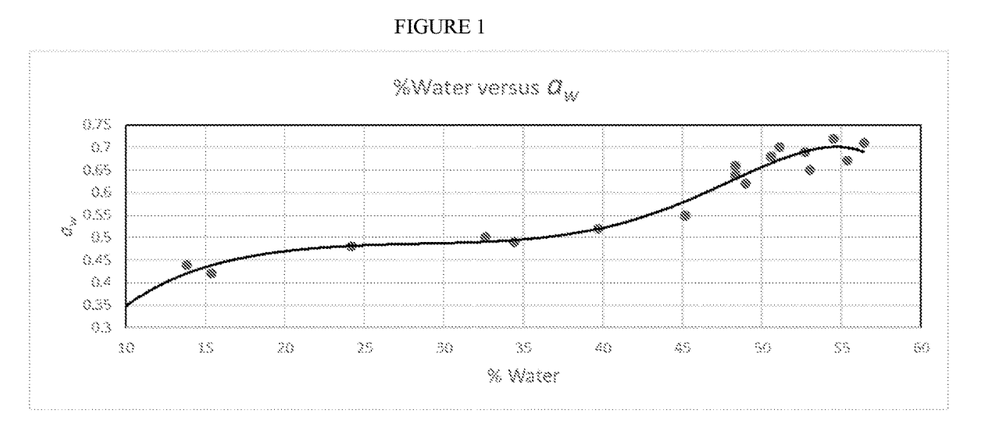
FIG. 1 illustrates water activity ($a_w$) versus % water for embodiments in accordance with Example 1.

The resulting saturated salt slurry/solution mixture exhibits a water activity ($a_w$) of approximately 0.49+/−0.05 for water content from approximately 12.3% to 43.3% and an $a_w$ of approximately 0.49+/−0.15 for water content from approximately 9.8% to 53.5% when tested against low and high humidity environments, respectively. FIG. 1 illustrates water activity ($a_w$) versus % water for embodiments in accordance with Example 1.

Figure 2:
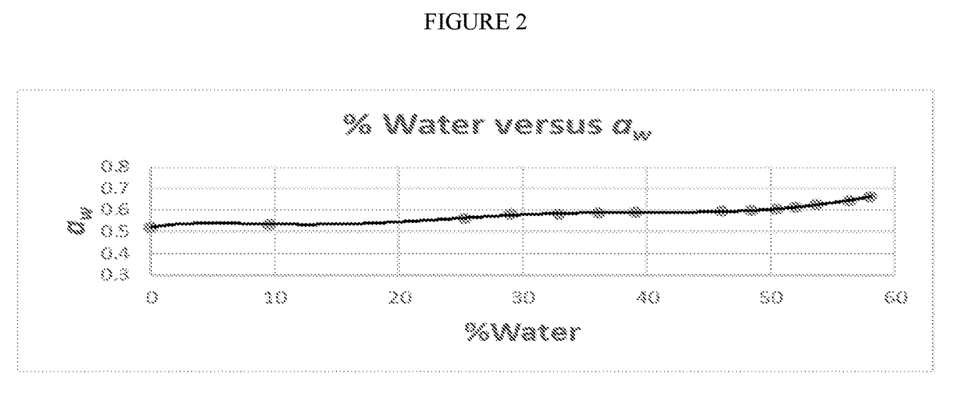
FIG. 2 illustrates water activity ($a_w$) versus % water for a control mixture in Example 1.

FIG. 2 illustrates water activity ($a_w$) versus % water for a control mixture. In comparison, a control mixture of 100 grams of water and 100 to 500 grams of sodium formate containing no glycerol, exhibits a water activity ($a_w$) of 0.59+/−0.05 range of relative humidity control for water content from 9.0% to 55.5% and an $a_w$ of approximately 0.59+/−0.15 for water content from approximately 0.0% to 58% when tested against low and high humidity environments, respectively.

The saturated salt slurry/solution in this example exhibits no odor and no crystals larger than typical table salt crystals form upon repeated cycling of moisture content within the operative relative humidity range.

In this example, comparing the saturated salt slurry/solution, with and without the additive clearly shows that the target relative humidity provided by the saturated salt slurry can be modified with addition of an additive.

Example 2

In another embodiment, a mixture of 100 grams of water is mixed with approximately 0.7 to 1.4 grams of xanthan gum until the gum is hydrated. Approximately 41 to 84 grams of 60% sodium lactate solution are added with continued mixing until homogeneous, followed by the addition of approximately 83 to 165 grams of sodium formate with continued mixing until the slurry is homogenous to form a saturated salt slurry/solution mixture.

Figure 3:
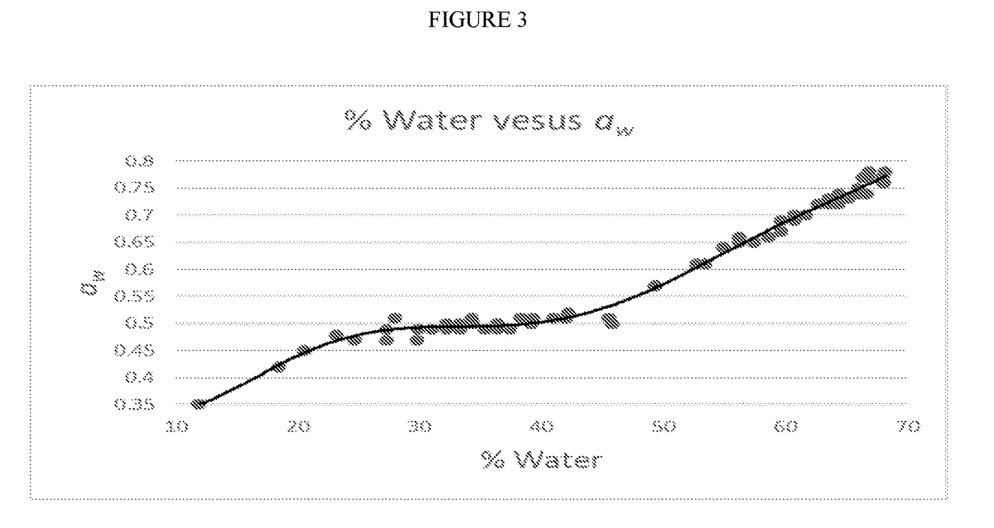
FIG. 3 illustrates water activity ($a_w$) versus % water for embodiments in accordance with Example 2.

The resulting saturated salt slurry/solution mixture exhibits a water activity ($a_w$) of approximately 0.49+/−0.05 for water content from approximately 21.8% to 47.6% and an $a_w$ of approximately 0.49+/−0.15 for water content from approximately 11.0% to 55.0% when tested against low and high humidity environments respectively. FIG. 3 illustrates water activity ($a_w$) versus % water for embodiments in accordance with Example 2.

This compares to a control mixture of 100 grams of water and 100 to 500 grams of sodium formate containing no sodium lactate which exhibits a water activity ($a_w$) of 0.59+/−0.05 range of relative humidity control for water content from 9.0% to 55.5% The saturated salt slurry/solution in this example exhibits a mild, non-offensive, odor and crystals larger than typical table salt crystals form only upon extended repeated cycling of moisture content within the operative relative humidity range. This example demonstrates that multiple additives, properly chosen, are available to modify the relative humidity target of the mixture while the mass of water available for controlling to the relative humidity target remains approximately the same.

Example 3

Figure 4:
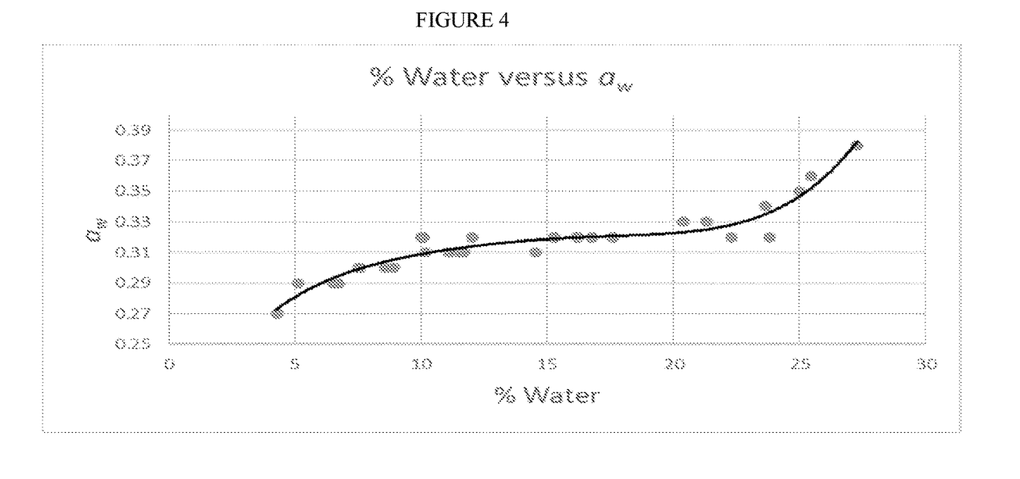
FIG. 4 illustrates water activity ($a_w$) versus % water for embodiments in accordance with Example 3.

In another embodiment, 100 grams of water are mixed with approximately 0.8 to 2.7 grams of hydroxyethylcellulose until the gum is hydrated, and approximately 6.5 to 7.5 grams of glycerol are added with stirring until the mixture is substantially homogeneous. Approximately 350 to 500 grams of magnesium chloride are added and the mixing is continued until the resultant slurry is substantially homogeneous to form a saturated salt slurry/solution mixture. The resulting saturated salt slurry/solution mixture exhibits a water activity ($a_w$) of approximately 0.32+/−0.01 for water content from approximately 8.3% to 22.6% when tested against low and high humidity environments, respectively. FIG. 4 illustrates water activity ($a_w$) versus % water for embodiments in accordance with Example 3.

Figure 5:
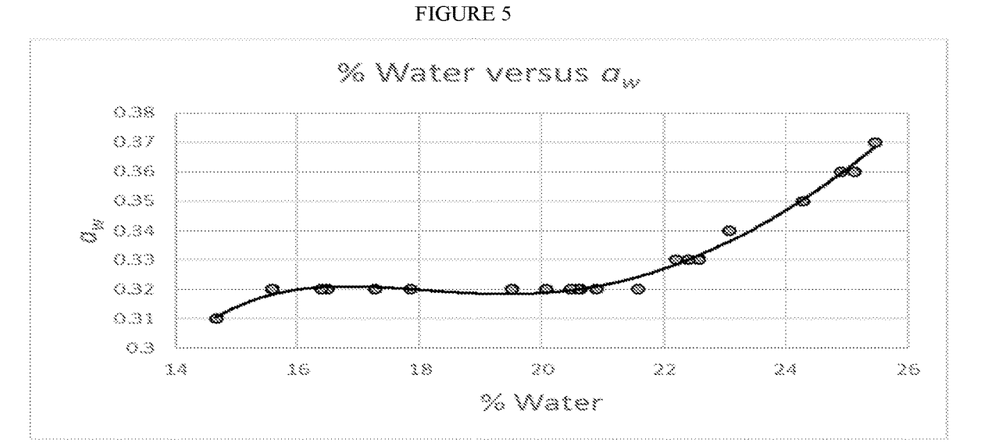
FIG. 5 illustrates water activity ($a_w$) versus % water for a control mixture in Example 3.

For comparison, a control mixture of 100 grams of water and approximately 350 to 500 grams of magnesium chloride with no glycerol is prepared. FIG. 5 illustrates water activity ($a_w$) versus % water for the control mixture which contains no glycerol and exhibits a water activity ($a_w$) of 0.32+/−0.01 range of relative humidity control for water content from approximately 14.7% to 22.6%.

Example 4

Figure 6:
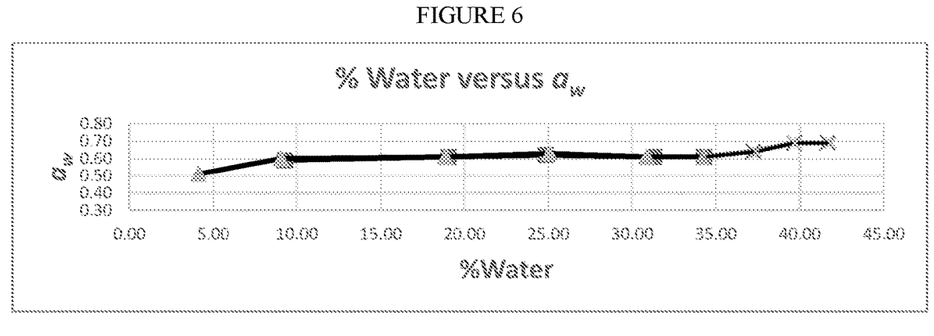
FIG. 6 illustrates water activity ($a_w$) versus % water for embodiments in accordance with Example 4.

In another embodiment, 100 grams of water are mixed with 0.7 to 1.3 grams of xanthan gum until the gum is hydrated, and approximately 1.25 to 2.5 grams of glycerol are added with stirring until the mixture is substantially homogeneous. Approximately 168 to 900 grams of potassium citrate are added, and the mixing is continued until the resultant slurry is substantially homogeneous to form a saturated salt slurry/solution mixture. The resulting saturated salt slurry/solution mixture exhibits a water activity ($a_w$) of approximately 0.62+/−0.05 for water content from approximately 6.6% to 38.3% and an $a_w$ of approximately 0.62+/−0.15 for water content from approximately 0% to 50% when tested against low and high humidity environments, respectively. FIG. 6 illustrates water activity ($a_w$) versus % water for embodiments in accordance with Example 6. The resulting saturated salt slurry/solution exhibits no odor and does not form large crystals upon repeated recycling between high and low humidity environments.

Figure 7:
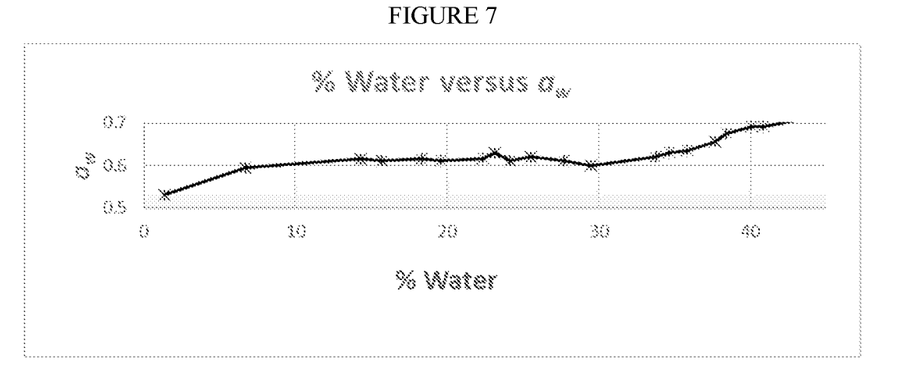
FIG. 7 illustrates water activity ($a_w$) versus % water for a control mixture in Example 4.

For comparison, a control mixture of 100 grams of water and 168 to 900 grams of potassium citrate with no glycerol is prepared. FIG. 7 illustrates water activity ($a_w$) versus % water for the control mixture which contains no glycerol, exhibits a water activity ($a_w$) of 0.62+/−0.05 range of relative humidity control for water content from 8.2% to 38.5% and an $a_w$ of approximately 0.62+/−0.15 for water content from approximately 0% to 48%. This example illustrates that using an additive increases the water gain or loss range within the target RH range.

Example 5

Figure 8:
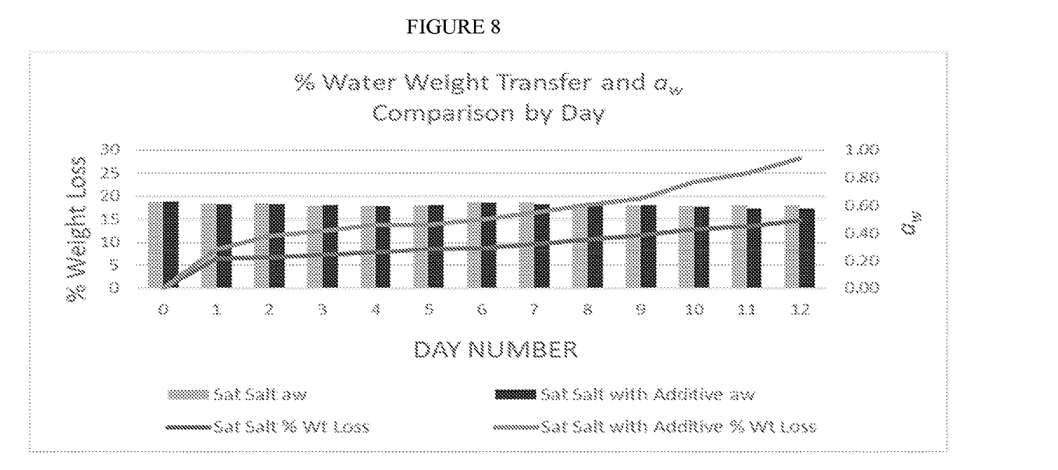
FIG. 8 illustrates water activity ($a_w$) versus percent weight transfer over time for embodiments (slurry/solution with additive and control) in accordance with Example 4 when held in a low relative humidity (RH) environment.

FIG. 8 illustrates water activity ($a_w$) verses % weight transfer when the slurries/solutions of Example 4 are placed in a low humidity environment, such as a relative humidity of approximately 10%. The days indicated on the x axis for each set of data represents the same calendar date. Thus, in FIG. 8, the data point at day 6 shows that for the formula with the additive (black bar for $a_w$, and the light grey line for % weight transfer) due to water transfer from the saturated salt slurry/solution to the surrounding low relative humidity atmosphere) $a_w$ is 0.62 and weight transfer is 15%. By comparison, the saturated salt slurry/solution without additive is shown as a grey bar for the same day/date with an $a_w$ of 0.62 and a % weight transfer of 8.7% shown as the black line. Alternatively assessing the weight transfer from a time perspective in this example, it takes 6 days for the saturated salt slurry/solution with additive of example 4 to reach 15% weight loss, while it takes 12 days for the saturated salt slurry/solution without additive to reach that approximate level. This example illustrates that in a low humidity environment, the saturated salt slurry/solution with additive in example 4 gives up water more rapidly (approximately 50 to 100% faster) and gives up more water than the control for a given period of time.

Example 6

Figure 9:
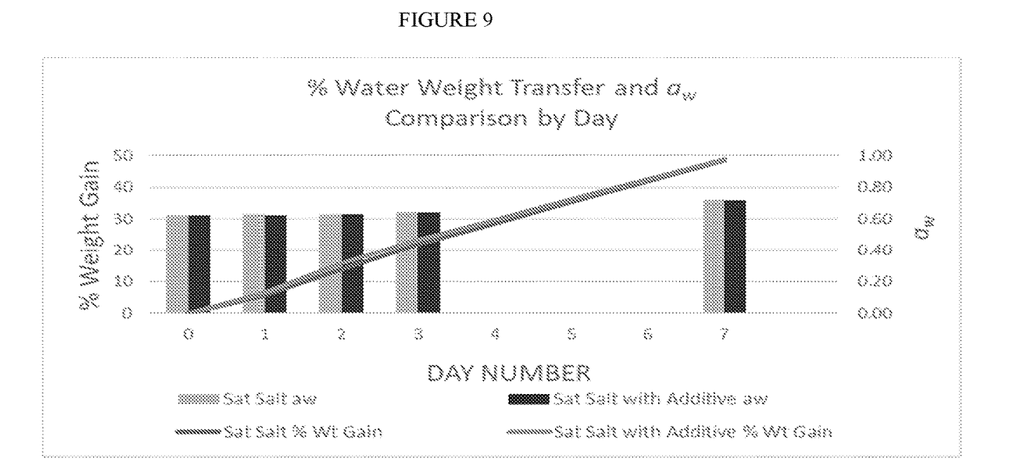
FIG. 9 illustrates water activity ($a_w$) versus percent weight transfer over time for embodiments (slurry/solution with additive and control) in accordance with Example 4 when held in a high relative humidity environment.

FIG. 9 illustrates water activity ($a_w$) verses % weight transfer when the slurries/solutions of Example 4 are placed in a high humidity environment, i.e. RH of approximately 85%. The days indicated on the x axis for each set of data represents the same calendar date. Thus, in FIG. 9, the data point at day 2 shows that both the formula with the additive (black bar for $a_w$, and the light grey line for % weight transfer due to water transfer from the saturated salt slurry/solution to the surrounding low RH atmosphere) $a_w$=0.63, weight transfer=15.9%, while the saturated salt slurry/solution without additive is shown as a grey bar for the same day/date with the $a_w$=0.63, and the % weight transfer=13.9% as the black line. Alternatively, assessing the weight transfer from a time perspective, it takes 2 days for the saturated salt slurry/solution with additive of example 4 to reach 15.9% weight gain, while it takes 2.25 days for the saturated salt slurry/solution without additive to approximately reach that level. This example illustrates that in a high humidity environment, the saturated salt slurry/solution with additive in example 4 gains water more rapidly (approximately 10 to 15% faster) and gains more water than the control for a given time frame.

In addition, the saturated salt slurry/solutions in the examples above show reduced large crystal formation, improved viscosity control which may aid in filling during production of products and no separation or settling after sitting for more than 24 hours which may allow for increased alternatives for storing and transportation.

In the examples above, the addition of the additives does not result in a loss of the "self-indicating" property when a container (particularly flexible containers) of the saturated salt slurry/solution has been expended when used in relative humidity conditions lower than the target relative humidity. Self-indicating may occur as a hardening or solidification of the slurry/solution that can be readily felt such as by the fingertips of the user. Self-indicating may occur when the user feels a flexible container with the saturated salt slurry/solution therein. If the contents of the container feel like a hard or stiff gel, for example, the user may know it is time to replace the saturated salt slurry/solution to assure continued humidity control protection. The user may then replace the container with a fresh container of slurry/solution.

As used herein, the terms "substantially" or "generally" refer to the complete or near complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an element may still actually contain such element as long as there is no significant effect thereof.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principles of the disclosure and their practical application, and to enable one of ordinary skill in the art to utilize the various embodiments with various modifications as suited to the particular use contemplated. All such modifications and variations are within the scope of the present disclosure as determined by the appended claims when interpreted in accordance with the breadth to which they are fairly, legally, and equitably entitled.

In the foregoing description various embodiments of the invention have been presented for the purpose of illustration and description. They are not intended to be exhaustive or to limit the invention to the precise form disclosed. Obvious modifications or variations are possible in light of the above teachings. The embodiments were chosen and described to provide the best illustration of the principals of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth they are fairly, legally, and equitably entitled.

What is claimed is:

1. A humidity control device for modifying and extending relative humidity control ranges, the humidity control device comprising:
   a water vapor permeable container; and
   a slurry contained within the container, the slurry comprising:

a saturated aqueous salt, the salt comprising sodium chloride, potassium chloride, and magnesium chloride; and one or more other reagents; and a food grade additive that is optically active to be visible in visible light, the optically active food grade additive being riboflavin;

wherein the slurry provides a controlled modifiable narrow range of relative humidity.

2. The humidity control device of claim 1, wherein the aqueous salt and the select other reagents are food grade per Foods Chemicals Codex (FCC).

3. The humidity control device of claim 1, wherein the slurry is substantially odorless.

4. The humidity control device of claim 1, wherein large crystals do not form in the slurry during normal use of the humidity control device.

5. The humidity control device of claim 1, wherein the one or more reagents comprise an acetate salt.

6. The humidity control device of claim 1 wherein said other reagents may be added as combinations.

7. The slurry of claim 1, wherein the slurry comprises 0 to 2% of a food grade gum providing viscosity control.

8. The humidity control device of claim 1 wherein the additive concentration exceeds the salt concentration.

9. The humidity control device of claim 1 wherein the slurry does not lose its self-indicating property with regard to need for replacement.

10. A humidity control device for modifying and extending relative humidity control ranges, the humidity control device comprising:

a water vapor permeable container; and a slurry contained within the water vapor permeable container, the slurry comprising:

a saturated aqueous salt comprising one or more of sodium chloride, potassium chloride, and/or magnesium chloride;

glycerol; and a food-grade additive that is uv-active to be visible in black light, the uv-active food-grade additive being riboflavin;

wherein the slurry provides a controlled modifiable narrow range of relative humidity.

11. The humidity control device of claim 10 further comprising up to 2% of a food grade gum.

* * * * *